June 11, 1929.     G. J. LIPSCOMB     1,716,786
FILTER ELEMENT
Original Filed May 23, 1927

Inventor
Gaston J. Lipscomb,
By Emery Booth Janney & Varney
Attorneys

Patented June 11, 1929.

1,716,786

UNITED STATES PATENT OFFICE.

GASTON JOEL LIPSCOMB, OF MONTCLAIR, NEW JERSEY.

FILTER ELEMENT.

Original application filed May 23, 1927, Serial No. 193,712. Divided and this application filed May 10, 1928. Serial No. 276,750.

This application, which is a division of my copending application Serial No. 193,712, filed May 23, 1927, relates to a filtering element adapted for use in pressure and vacuum filters of the type therein disclosed. This invention aims to provide relatively thin filtering elements adapted to be assembled in a compact stack or pile constituting a filtering cartridge which may be readily inserted in or removed from such a filter, and which will have a relatively large effective filtering area within relatively small external dimensions.

The following specification and accompanying drawings disclose illustrative embodiments of my invention. In the drawings, which are all on the same scale, Fig. 1 is a partial central vertical cross section and partial elevation of my improved filter, showing the construction of individual elements and the method of assembling them;

Figure 1:
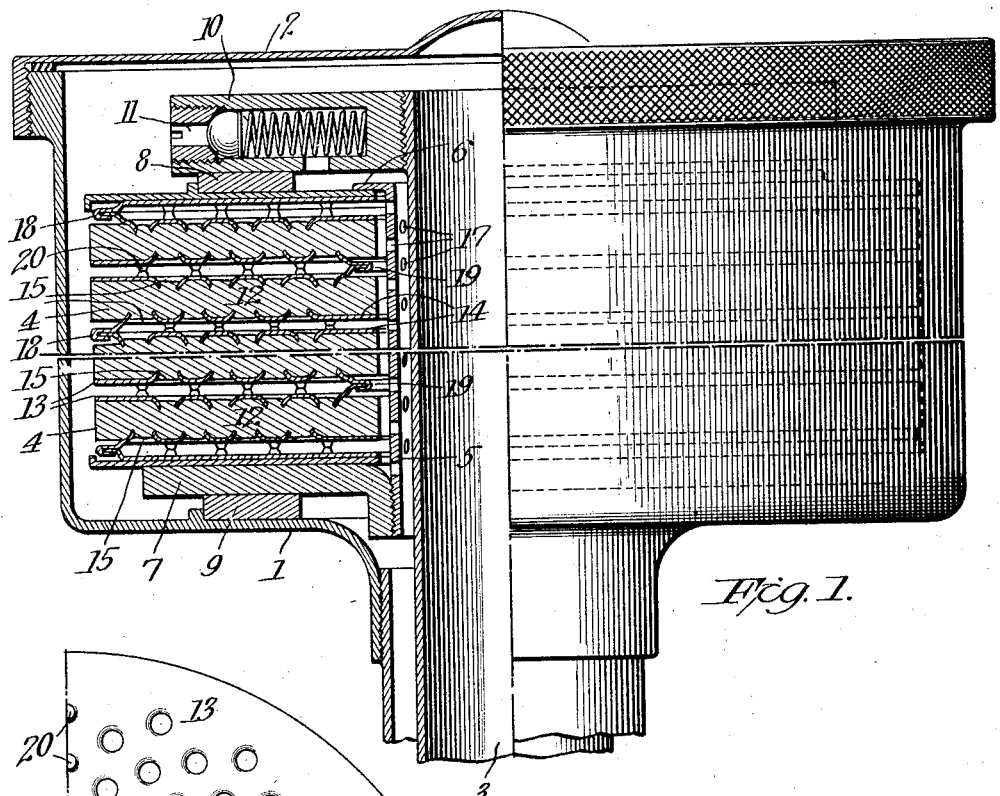

In the present embodiment the filter consists of a casing 1 with a removable oil-tight cap 2. A central longitudinal supply pipe 3 projects nearly to the top of the casing and is surrounded by the filter cartridge, which comprises a plurality of individual elements, conveniently made in the shape of wide flat rings 4 assembled together around a tube or sleeve 5, which also serves as an outlet passage. The pile of rings 4 is clamped on the tube 5 between a top flange 6 and a bottom nut 7, and this entire assembly is secured in the casing between upper and lower gaskets 8 and 9 by means of a top nut 10 threaded upon the upper end of the central supply pipe 3. By-pass valves such as 11, are contained in the top nut. The casing 1, holding elements 6, 7 and 10, packing means 8 and 9, and by-pass valves 11, do not in themselves relate to the present divisional application, and reference is hereby made to my copending application Serial No. 193,712, for a more complete description of these features.

Figure 2:
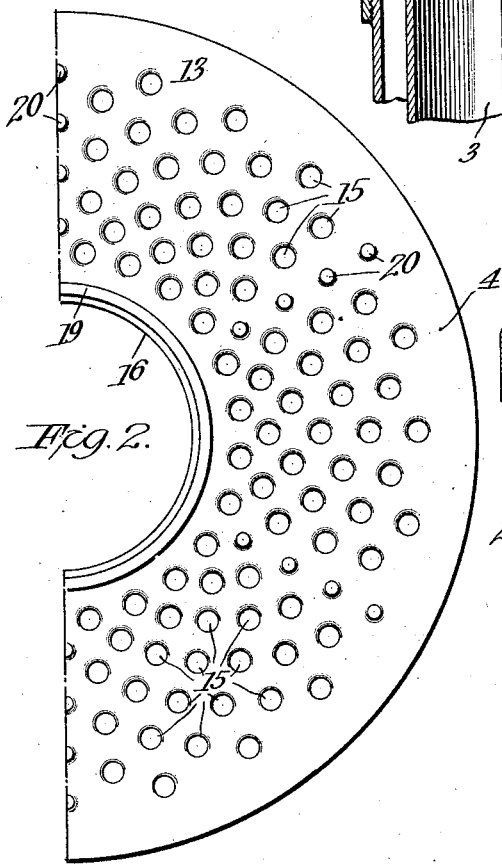
Fig. 2 is a top plan view of half of a filter element.

Each filter ring 4 of the preferred form illustrated in Figs. 1 and 2 comprises a layer of a suitable filtering medium 12 held between a pair of thin face sheets 13, 14 of metal or other appropriate material. Each of these face sheets has a large number of perforations 15 with inturned rough edges to hold the filtering material 12 in place. These inturned rough edges, embedded in the filtering material as shown, hold the face plates to the filtering material of each ring and bind the face plates and the filtering material into a unitary structure. This is particularly desirable in the form of the invention shown in Fig. 3, as it facilitates the replacement of one ring as a unit, as hereinafter described. These perforations, as well as the uncovered inner and outer edges of each ring 4, constitute the oil passages into and out of the rings. Each ring is centrally apertured as at 16 in proper size to surround the outlet tube 5 at a little distance, to permit filtered oil to enter the tube through holes 17. The opposing face sheets 13, 13 and 14, 14 of adjacent rings are assembled in the order shown in Fig. 1, alternate pairs of sheets being crimped together by flanges 18 and 19, alternately at the outer and inner edges.

Bosses 20 project outwardly from the face sheets of each ring to support and space said sheets at intermediate points.

Figure 3:
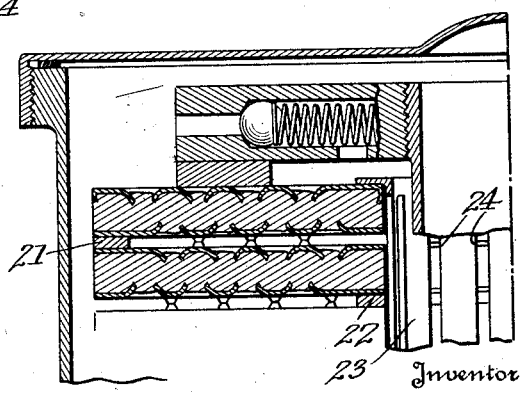
Fig. 3 is a partial central vertical cross section illustrating a modified form of filter element.

A modified ring construction is illustrated in Fig. 3. In this form oil-tight gaskets 21, 22 of fiber or other suitable material replace the crimped flanges 18 and 19 at the outer and inner edges of successive adjoining face sheets. The inner edges of the modified filter rings fit snugly against the outlet tube 23, which tube is similar to the tube 5 except that it is longitudinally slotted as at 24, instead of being perforated.

In the operation of my filter the oil is introduced through the central tube 3 and flows into the casing 1 outside the filter rings 4. The packing collars 8 and 9 and the flanges 18 and 19 or their equivalents prevent flow of oil to the outlet tube except through the filtering material 12 in the rings 4. The oil flows into the spaces between those pairs of face sheets 13 which are crimped on their inner edges at 19. From these spaces the oil flows through the adjacent perforations 15 in the face sheets into the mass of filtering material 12 above and below, filters through, and escapes by the opposite perforations 15 into the spaces between the face sheets 14 which are crimped on their outer edges, at 18. A certain amount of oil may also travel through the edges of each ring, these being uncovered. Oil in the spaces between the outwardly crimped face sheets 14 runs through the perforations 19 in the outlet tube 5 and downwardly between this tube and the inlet tube 3, being collected and led off at the bottom of the filter as shown in detail in my application Serial No. 193,712. It will be evident from the above that all oil passing through the filter cartridge will be compelled to pass through a layer of the filtering material 12.

For replacement of the filter cartridge it is necessary only to shut off the oil stream and remove the casing cap 2 and the nut 10, whereupon the cartridge assembly comprising the rings 4, tube 5, and nut 7, can be lifted out and a new cartridge slipped in. By merely replacing the nut 10 and cap 2 the filter is ready for further running, without any adjustment. In case it is desired to change an individual filter ring, this may be done by removing the bottom nut 7, slipping the pile of rings off the tube 5 and breaking the pile at the desired point. In the form shown in Fig. 3 this can be accomplished by simply lifting off all rings above the one to be replaced and by putting in another ring with the necessary gaskets 21 and 22. To change a ring in the form shown in Fig. 1 it is necessary first to open the crimps 18 and 19 where the old ring is to be removed and afterwards to properly crimp the face sheets of the new ring in place.

It will be seen from the foregoing that I have invented a filtering element adapted for use in a compact, high-duty pressure or vacuum filter where simplicity of construction, certainty of operation and ready replacement of parts are important factors in successful use.

In the present embodiment of my invention the filter elements are illustrated and described as constructed in the form of flat rings, but it is to be understood that the invention is not limited to this particular shape, but may be variously modified within the scope of the appended claims.

What I claim is:

1. In a pressure filter, a filter cartridge comprising a plurality of flat filter rings, each of said rings consisting of a pair of foraminous annular face sheets with a layer of filtering material therebetween, said layer being open at the edges, and uniformly compressed throughout.

2. A filter cartridge composed of a plurality of flat filter rings spaced apart by liquid-tight spacing elements between the inner and outer peripheries of alternate rings, each of said rings comprising a layer of filtering material and a pair of disks, upset perforations in said disks, said upsets being directed into said filtering material.

3. A filter cartridge comprising a plurality of filter rings with liquid spaces therebetween, said liquid spaces being, alternately, in communication with a source of unfiltered liquid and an outlet for filtered liquid, each of said rings comprising a layer of filtering material open at the edges and of uniform consistency throughout.

4. In a pressure filter, in combination, filtering rings comprising flat annular metal face sheets having rough-edged upset perforations, said sheets being arranged in pairs with said rough edges inwardly directed, each of said pairs having a layer of filtering material therebetween.

5. In a pressure filter, in combination, a filtering element consisting of two foraminous retaining sheets with a layer of filtering material therebetween, and projections on said sheets embedded in the filtering material and retained thereby.

6. In a vacuum filter, a filter cartridge comprising a plurality of flat filter rings, each of said rings consisting of a pair of foraminous annular face sheets with a layer of filtering material therebetween, said face sheets being provided with projections embedded in the filtering material and retained thereby.

7. In a filter, in combination, filtering rings comprising flat annular metal face sheets having rough-edged upset perforations, said sheets being arranged in pairs with said rough edges inwardly directed, each of said pairs having a layer of filtering material therebetween.

8. In a vacuum filter, in combination, filtering rings comprising flat annular metal face sheets having rough-edged upset perforations, said sheets being arranged in pairs with said rough edges inwardly directed, each of said pairs having a layer of filtering material therebetween.

9. In a power filter, in combination, a series of superposed filter elements, each of said elements comprising two retaining sheets and an intermediate layer of filtering material, perforations in said sheets having edges projecting into said filtering material and adapted to hold the same in place, bosses on said sheets projecting oppositely to said edges and adapted to separate said filter elements, and sealing means between adjacent elements adapted to direct the flow of fluid therethrough.

In testimony whereof, I have signed my name to this specification.

GASTON JOEL LIPSCOMB.